United States Patent [19]

Wynn

[11] 4,129,145

[45] Dec. 12, 1978

[54] CHECK VALVE ASSEMBLY

[76] Inventor: James M. Wynn, 2203 McLaughlin Ave. #4, San Jose, Calif. 95122

[21] Appl. No.: 800,661

[22] Filed: May 26, 1977

[51] Int. Cl.² ............................................. F16K 15/02
[52] U.S. Cl. ..................................... 137/541; 251/357
[58] Field of Search ........................... 137/541, 516.29; 251/333, 357

[56] References Cited

U.S. PATENT DOCUMENTS

| | | | |
|---|---|---|---|
| 2,481,482 | 9/1949 | Green | 137/516.29 X |
| 2,912,002 | 11/1959 | Miller | 137/541 |
| 2,973,007 | 2/1961 | Schutmaat | 251/333 X |
| 3,001,546 | 9/1961 | Salisbury | 137/541 |
| 3,267,959 | 8/1966 | Savage | 137/541 X |
| 3,335,751 | 8/1967 | Davis, Jr. | 251/333 X |
| 3,338,257 | 8/1967 | Ferguson | 137/516.29 X |

Primary Examiner—William R. Cline
Attorney, Agent, or Firm—Townsend and Townsend

[57] ABSTRACT

A check valve assembly is disclosed. A hollow valve body is provided with respective upstream and downstream ends. A valve seat is located on the interior of the valve body and has an annular seating surface directed toward the downstream end of the valve body. The seating surface is inclined at an acute angle relative to the centerline of the valve body. A poppet element is provided which has a circumferential surface with a relatively narrow neck proximate the valve seat. The circumferential surface of the poppet element on the downstream side of the neck has a frustoconical configuration. A deformable resilient O-ring circumscribes the poppet element at the neck. The outer diameter of the O-ring is greater than the inner diameter of the annular seating surface of the valve seat so that the flow of fluid through the valve body from the downstream end to the upstream end presses the O-ring against the seating surface to close the valve.

8 Claims, 5 Drawing Figures

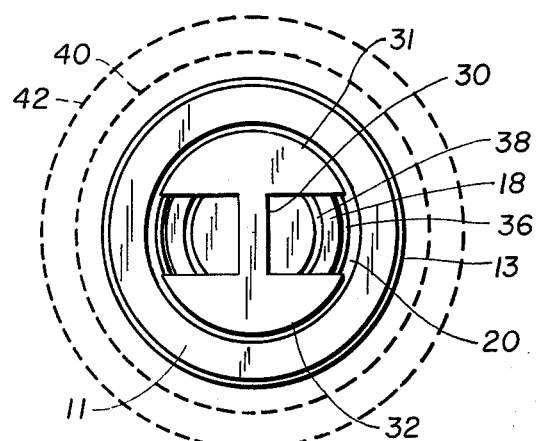
FIG._2.
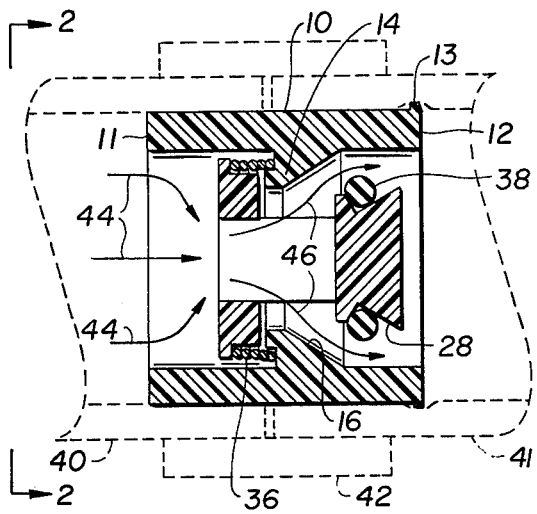
FIG._1A.
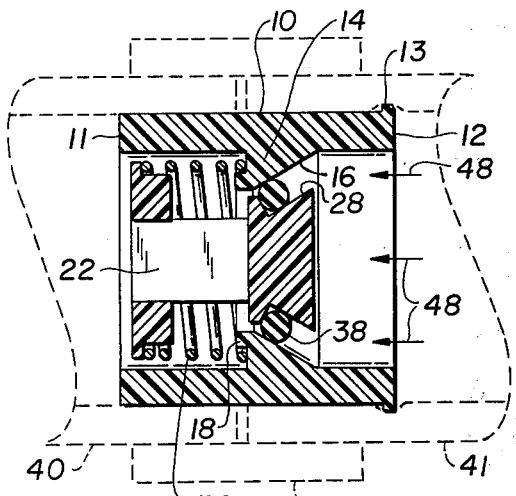
FIG._1B.
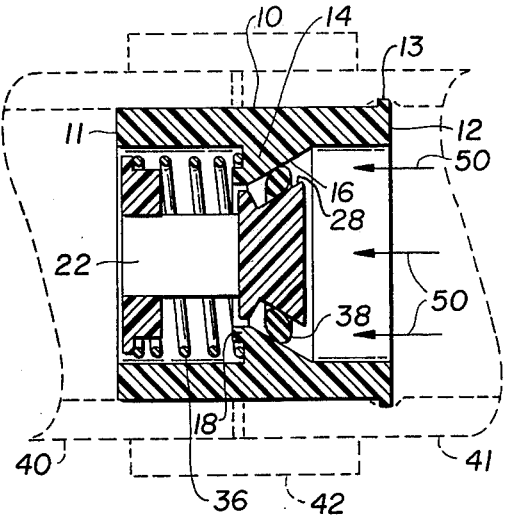
FIG._1C.
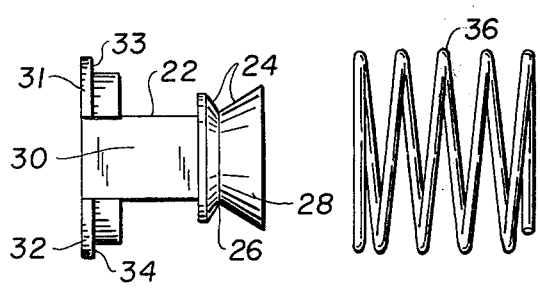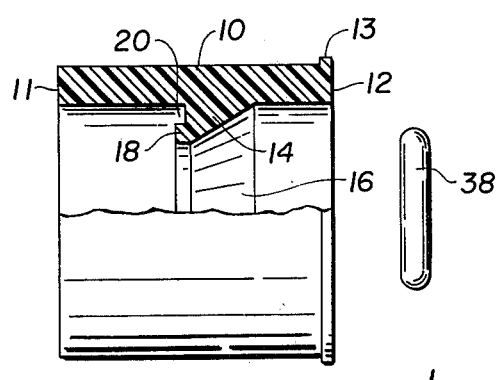
FIG._3.

CHECK VALVE ASSEMBLY

BACKGROUND OF THE INVENTION

The present invention relates to check valve assemblies, and in particular to check valves in which an O-ring is used as the sealing element.

Check valves have been used in the past in which an O-ring is the sealing element, as typified by the patents to Davis, U.S. Pat. No. 3,335,751 and the patent to Bogossian, U.S. Pat. No. 3,590,851.

In devices of the Davis type, the O-ring is embedded in one surface and engages a second seating surface perpendicular to the centerline of the conduit to close the valve. It has been found that valves of this type often do not provide a sufficiently tight closure to prevent leakage. Valves of the Bogossian type utilize a valve seat which is inclined with respect to the centerline of the valve, and the contact of the O-ring with the inclined seating surface is more secure. However, valves of this type have been found to often stick in the closed position because the O-ring becomes wedged between the poppet element and the seating surface, particularly when only low pressure is available to open the valve.

In valves of the Davis and Bogossian types, both ends of the poppet element must be larger than the intervening seat to accommodate the O-ring on one side and a spring retention member on the other. This type of construction is difficult to achieve because of the problems involved in assembling the poppet assembly from two or more parts while it is located in the valve.

SUMMARY OF THE INVENTION

The present invention provides a check valve assembly which includes a hollow valve body with respective upstream and downstream ends. A valve seat is located on the interior of the valve body and has an annular seating surface directed toward the downstream end of the valve body. The seating surface is inclined at an acute angle relative to the centerline of the valve body. A poppet element is provided which has a circumferential surface with a relatively narrow neck proximate the valve seat. The circumferential surface of the poppet element on the downstream side of the neck has a frustoconical configuration. A deformable resilient O-ring circumscribes the poppet element at the neck. The outer diameter of the O-ring is greater than the inner diameter of the annular seating surface of the valve seat so that the flow of fluid through the valve body from the downstream end to the upstream end presses the O-ring against the seating surface to close the valve.

The respective inclinations of the seating surface and the frustoconical portion of the circumferential surface of the poppet element allow the O-ring to roll up the frustoconical portion of the element when pressure is exerted on the poppet element to close the valve. This prevents the O-ring from being wedged between the poppet element and the seating surface so that upon relaxation of the pressure, the O-ring readily releases from the seating surface without sticking thereto. It is preferred that the respective inclinations be equal, preferably approximately 30° each, although ranges between about 20°–50° and inequality of inclination may also be acceptable.

In the preferred embodiment of the present invention, the outer diameter of the circumferential surface of the poppet element is less than the inner diameter of the seating surface of the valve seat. As a result, the valve can be constructed by inserting the circumferential surface of the poppet element through the seating surface from the upstream end of the valve body, and then placing the O-ring on the poppet element from the downstream end of the valve body to complete the check valve assembly. This procedure is much more simple than attempting to fasten two elements together within the valve, as required by the prior art.

The novel features which are characteristic of the invention, as to organization and method of operation together with further objects and advantages thereof will be better understood from the following description considered in connection with the accompanied drawings which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIGS. 1A, 1B and 1C are side cross sectional views of the preferred embodiment of the present invention illustrating the valve in the open, closed at low pressure, and closed at high pressure configurations respectively;

FIG. 2 is a cross sectional view taken along lines 2—2 of FIG. 1A;

FIG. 3 is an exploded view of the preferred embodiment of the present invention.

DESCRIPTION OF THE PREFERRED EMBODIMENT

The elements of the preferred embodiment of the present invention are best illustrated by FIG. 3 with reference back to the preceding figures.

A tubular sleeve 10 is provided which is designated as having upstream and downstream ends 11, 12 respectively for convenient reference. A shoulder 13 is located at the upstream end of the valve body 10 to provide a fluid tight seal with a circumscribing conduit in the embodiment shown. However, it is apparent that various valve body configurations are possible within the context of the present invention for use in different applications.

A valve seat 14 is located on the interior surface of valve body 10. Valve seat 14 has a seating surface 16 facing toward the downstream end 12 of the valve body 10. Seating surface 16 is preferably inclined at an angle of approximately 30° with respect to the centerline of valve body 10. However, angles of inclination between approximately 20° to 50° may be acceptable. A shoulder 18 is located on the upstream side of the valve seat 14 and defines a recess 20.

A poppet element 22 is adapted to be inserted within valve body 10 through the upstream end 11 thereof. Poppet element 22 has a circumferential surface 24 at its downstream end. Circumferential surface 24 has a narrow neck 26, and the portion 28 of circumferential surface 24 downstream of neck 26 has a frustoconical configuration. Frustoconical surface 28 is preferably at the same angle of inclination with respect to the centerline of valve body 10 as seating surface 16, i.e., 30°, but angles of inclination between about 20° and 50° may again be acceptable.

Poppet element 22 has a thin stem 30 (see FIG. 2) with a pair of outwardly directed flanges 31, 32 at its upstream end. The outer edges of flanges 31, 32 are proximate and conform to the interior surface of the valve body 10, and provide raised shoulders 33, 34. When poppet element 22 is inserted within valve body 10, a spring 36 is interposed between shoulders 33, 34 on flanges 31, 32 and the recess 20 on valve seat 14 to bias the poppet element toward the upstream end 11 of sleeve 10.

After installation of poppet element 22 within sleeve 10, an O-ring 38 is slipped over the upstream end of poppet element 22 and located in the neck 26 of circumscribing surface 24. The outer diameter of circumscribing surface 24 is less than the interior diameter of valve seat 14 so that the poppet element can readily be installed within the valve body 10. However, the outer diameter of O-ring 38 is larger than the inner diameter of valve seat 14 so that the O-ring provides a closure for the valve.

The operation of the preferred embodiment of the check valve of the present invention is illustrated by way of reference to FIGS. 1A, 1B and 1C. In each of these figures, a valve body 10 is installed at the junction between a pair of conduits 40, 41 joined by a tape, band or other such binding element 42. The shoulder 13 on 10 provides a fluid tight seal between sleeve 10 and conduit 41 so that all of the fluid in the conduits is required to flow through the interior of the valve body.

As illustrated in FIG. 1A, when fluid is flowing through the interior of valve body 10 from its upstream end 11 to its downstream end 12, as depicted by arrows 44, spring 36 is compressed and a gap is provided between O-ring 38 and the inclined seating surface 16 of valve seat 14. As a result, the fluid flows freely through the valve as depicted by arrows 46.

When the direction of fluid flow reverses, as illustrated in FIG. 1B by arrows 48, spring 36 expands until O-ring 38 is in contact with the inclined seating surface 16 of valve seat 14. O-ring 38 is compressed between the frustoconical surface 28 of poppet element 22 and the inclined seating surface 16 of valve seat 14 so that an effective seal can be provided at very low back pressures, as low as 0.5 oz.

When higher back pressures are imposed on the valve assembly, as depicted in FIG. 1C by arrows 50, poppet element 22 moves slightly further toward the upstream end 11 of valve body 10. However, O-ring 38 does not become wedged between the poppet element and the seating surface as with prior art valves. Rather, O-ring 38 tends to roll up the frustoconical surface of poppet element 22 to accommodate the increased pressure (at extremely high pressures, in excess of approximately 100 lbs/in.$^2$, O-ring 38 will be blown off poppet element 22, and the valve of the present invention is only usable at relatively low pressures). With O-ring 38 in the configuration illustrated in FIG. 1C, it does not tend to stick to seating surface 16. Accordingly, when the back pressure is released, O-ring 38 readily releases from the seating surface and the valve does not stick, even if the pressure tending to open the valve is extremely small. Also, upon release of the back pressure, O-ring 38 returns to its normal configuration in the neck 26 of circumferential surface 24 of poppet element 22.

While a preferred embodiment of the present invention has been illustrated in detail, it is obvious that modifications and adaptations of the present invention will occur to those skilled in the art. However, it is to be expressly understood that such modifications and adaptations are within the spirit and scope of the present invention, as set forth in the following claims.

What is claimed is:

1. A check valve assembly comprising:
   a valve body having an upstream end and a downstream end;
   a valve seat located on the interior of the valve body and having an annular seating surface directed toward the downstream of the valve body, said seating surface being inclined at an acute angle relative to the centerline of the valve body;
   a poppet element having a circumferential surface with a relatively narrow neck located proximate the valve seat, the circumferential surface of the poppet element on the upstream side of the neck and downstream of the valve seat having an outer diameter less than the inner diameter of the valve seat so that the poppet element cannot contact the valve seat on the downstream side thereof upon closure of the valve, the circumferential surface of the poppet element on the downstream side of the neck having a frustoconical configuration inclined at an acute angle relative to the centerline of the valve body substantially equal to said acute angle of the seating surface; and
   a deformable resilient O-ring circumscribing the poppet element and located in the narrow neck, the outer diameter of the O-ring being greater than the inner diameter of the annular seating surface of the valve seat so that the flow of a fluid through the sleeve from the downstream end to the upstream end thereof presses the O-ring against the seating surface of the valve seat, the inclination of the seating surface and the frustoconical portion of the circumferential surface of the poppet element being sufficient to allow the O-ring to roll up the frustoconical portion of the circumferential surface of the poppet element so that upon relaxation of pressure of the O-ring against the seating surface, the O-ring readily releases from the seating surface without sticking thereto.

2. A check valve assembly as recited in claim 1 wherein the poppet element includes a stem which extends through the interior of the seating surface of the valve seat, flange means extending outwardly from the stem upstream of the seating surface to a postion proximate the interior surface of the valve body, and a spring compressed between the flanges and the upstream end of the valve seat to bias the poppet element toward the upstream end of the valve body.

3. A check valve assembly as recited in claim 1 wherein said angles of inclination are equal to approximately 30°.

4. A check valve assembly as recited in claim 1 wherein the outer diameter of the circumferential surface of the poppet element downstream of the neck is less than the inner diameter of the seating surface of the valve seat so that the circumferential surface of the poppet element can be inserted through the seating surface of the valve seat and the O-ring thereafter installed on said circumferential surface to assemble the check valve assembly.

5. A check valve assembly comprising:
   a valve body having an upstream end and a downstream end;
   a valve seat located on the interior of the valve body and having an annular seating surface directed toward the downstream end of the valve body, said surface being inclined at an acute angle relative to the centerline of the valve body;

a poppet element having a circumferential surface with a relatively narrow neck located proximate the valve seat, the circumferential surface of the poppet element on the downstream side of the neck having a frustoconical configuration inclined at an acute angle relative to the centerline of the valve body substantially equal to said acute angle of the seating surface, said circumferential surface downstream of the valve seat having an outer diameter less than the inner diameter of the valve seat so that the circumferential surface of the poppet element can be inserted through the valve seat from the upstream end of the valve body and the poppet element cannot contact the valve seat on the downstream side thereof upon closure of the valve; and a deformable resilient O-ring mounted on the poppet element and located in the narrow neck after insertion of the poppet element through the valve seat, the outer diameter of the O-ring being greater than the inner diameter of the annular seating surface of the valve seat so that the flow of a fluid through the valve body from the downstream end to the upstream end thereof presses the O-ring against the seating surface of the valve seat to close the valve, the inclination of the seating surface and the frustoconical portion of the circumferential surface of the poppet element being sufficient to allow the O-ring to roll up the frustoconical portion of the circumferential surface of the poppet element so that upon relaxation of pressure of the O-ring against the seating surface, the O-ring readily releases from the seating surface without sticking thereto.

6. A check valve assembly as recited in claim 5 wherein the poppet element includes a stem which extends through the interior of the seating surface of the valve seat, flange means extending outwardly from the stem upstream of the seating surface to a position proximate the interior surface of the valve body, and a spring pressed between the flange means and the upstream end of the valve seat to bias poppet element toward the upstream end of the valve body.

7. A check valve assembly as recited in claim 5 wherein the angle of inclination of the inclined seating surface with respect to the centerline of the sleeve and the angle of inclination between the frustoconical circumferential surface of the poppet element with respect to the centerline of the sleeve are substantially equal to 30°.

8. A check valve assembly comprising:
 a valve body having an upstream end and a downstream end;
 a valve seat located on the interior of the valve body and having an annular seating surface directed toward the downstream end of the valve body, said seating surface being inclined at an angle of approximately 30° relative to the centerline of the sleeve;
 a poppet element having a circumferential surface with a relatively narrow neck located proximate the valve seat, the circumferential surface of the poppet element on the downstream side of the neck having a frustoconical configuration with an angle of inclination with respect to the centerline of the sleeve of approximately 30°, the outer diameter of the circumferential surface of the poppet element downstream of the valve seat being less than the inner diameter of the valve seat so that the poppet element can be inserted from the upstream end of the valve body for assembly and the poppet element will not contact the valve seat on the downstream side thereof upon closure of the valve; and
 a deformable resilient O-ring circumscribing the poppet element and located in the narrow neck, the outer diameter of the said O-ring being greater than the inner diameter of the annular seating surface of the valve seat so that the flow of a fluid through the valve body from the downstream end to the upstream end thereof presses the O-ring against the seating surface of the valve seat; the inclination of the seating surface and the frustoconical portion of the circumferential face of the poppet element allowing the O-ring to roll up the frustoconical portion of the circumferential surface of the poppet element so that upon relaxation of pressure of the O-ring against the seating surface, the O-ring readily releases from the seating surface without sticking thereto.

* * * * *